United States Patent [19]

Onodera

[11] Patent Number: 4,625,584

[45] Date of Patent: Dec. 2, 1986

[54] SPLIT AXLE DRIVE MECHANISM FOR PART-TIME FOUR-WHEEL DRIVE VEHICLE

[75] Inventor: Takayoshi Onodera, Toyota, Japan

[73] Assignee: Toyota Jidosha Kabushiki Kaisha, Toyota, Japan

[21] Appl. No.: 795,255

[22] Filed: Nov. 5, 1985

[30] Foreign Application Priority Data

| Nov. 5, 1984 | [JP] | Japan | 59-232882 |
| Nov. 9, 1984 | [JP] | Japan | 59-170667[U] |
| Nov. 13, 1984 | [JP] | Japan | 59-171886[U] |
| Nov. 13, 1984 | [JP] | Japan | 59-238796 |
| Nov. 19, 1984 | [JP] | Japan | 59-175551[U] |
| Nov. 20, 1984 | [JP] | Japan | 59-175826[U] |
| Nov. 20, 1984 | [JP] | Japan | 59-175827[U] |
| Nov. 21, 1984 | [JP] | Japan | 59-177136[U] |

[51] Int. Cl.$^4$ .............. B60K 23/04; B60K 23/08; F16H 1/40
[52] U.S. Cl. .................... 74/713; 74/467; 74/66 SF; 74/711; 180/247; 184/11.1
[58] Field of Search .......... 74/467, 66 SF, 711, 74/713; 180/247; 184/11.1, 13.1, 6.12

[56] References Cited

U.S. PATENT DOCUMENTS

| 2,913,929 | 11/1959 | Anderson | 180/247 X |
| 3,058,558 | 10/1962 | Hawk | 180/247 X |
| 4,271,722 | 6/1981 | Campbell | 180/247 X |
| 4,341,281 | 7/1982 | Nagy | 180/247 |
| 4,373,604 | 2/1983 | Lunn et al. | 180/247 |
| 4,381,828 | 5/1983 | Lunn et al. | 180/247 |
| 4,407,387 | 10/1983 | Lindbert | 180/247 |
| 4,452,331 | 6/1984 | Lunn et al. | 180/247 |

Primary Examiner—Allan D. Herrmann
Attorney, Agent, or Firm—Cushman, Darby & Cushman

[57] ABSTRACT

A split axle drive mechanism for a part-time four-wheel drive vehicle comprises a first axle shaft connected to one side gear of a differential, a first output member arranged to be connected to the first axle shaft, a second axle shaft axially slidably connected to the other side gear of the differential, a second output member arranged to be connected to the second axle shaft, a clutch mechanism disengageable for disconnecting the first axle shaft from the first output member when the vehicle is in a two wheel drive mode and engageable for connecting the first axle shaft to the first output member when the vehicle is in a four wheel drive mode, a connecting rod axially slidably disposed in the axle shafts and operatively connected at its one end with the clutch mechanism and at its other end with one end of the second axle shaft to be maintained in a first position for disconnecting the second axle shaft from the second output member in response to disengagement of the clutch mechanism and to be moved from the first position to a second position for connecting the second axle shaft to the second output member in response to engagement of the clutch mechanism.

12 Claims, 13 Drawing Figures

SPLIT AXLE DRIVE MECHANISM FOR PART-TIME FOUR-WHEEL DRIVE VEHICLE

BACKGROUND OF THE INVENTION

The present invention relates to split axle drive mechanisms, and more particularly to a split axle drive mechanism for part-time four-wheel drive vehicles which include a transfer device adapted to change the operating mode of the vehicle drive system between a two wheel drive mode and a four wheel drive mode.

To reduce wear and power consumption caused by back drive of the non-driven road wheels in the two wheel drive mode, a split axle drive mechanism has been proposed in the U.S. Pat. No. 4,341,281 granted to Laszlo Nagy on July 27, 1982. The split axle drive mechainsm comprises an automotive type differential which has an input to the differential case and a pair of outputs connected to respective side gears of the differential and adapted to be connected to the respective split axle parts. One of the outputs is directly connected to one side gear of the differential, while the other output is connected to the other side gear of the differential through a clutch which is disengageable for preventing back drive to the other side gear when the vehicle is in the two wheel drive mode. In such an arrangement of the split axle drive mechanism, however, the pinion gears and side gears in the differential are inevitably rotated by back drive applied thereto from one of the non-driven road wheels when the two wheel drive mode is selected at the transfer device. This results in wear of component parts in the differential.

In the U.S. Pat. No. 4,271,722 granted to Chris A. Campbell on June 9, 1981, there has been proposed a differential for a four-wheel drive vehicle which comprises an integral remotely operable axle disconnect means adapted to prevent back drive to the differential side gears when the vehicle is in the two wheel drive mode. The axle disconnect means comprises a pair of shiftable clutch collars slidably splined to each axle shaft and each having face coupling teeth engageable with opposed mating teeth on the hub of each differential side gear. The respective clutch collars are arranged to be mutually inwardly moved for engagement with the respective side gears and to be mutually outwardly moved for disengagement from the side gears. For effecting such reciprocal motion of the clutch collars, the differential further comprises an elongated control rod arranged in parallel with the differential case and axially slidably mounted within the differential housing to be driven by a single two-position actuator, a direct control arm rigidly secured at its one end to the control rod and extending toward one of the clutch collars for engagement therewith, and a lever arm linkage pivotally secured within the differential housing and having one end connected to the control rod and the other end in engagement with the other clutch collar. In such an arrangement of the two clutch collars, however, the differential housing becomes large in size due to provision of the elongated control rod for connection to the lever arm linkage.

SUMMARY OF THE INVENTION

It is, therefore, a primary object of the present invention to provide a split axle drive mechanism in the form of a differential wherein a clutch mechanism is arranged in a simple construction to prevent back drive to components in the differential when the vehicle is in the two wheel drive mode.

According to the present invention, there is provided a split axle drive mechanism for a part-time four-wheel drive vehicle equipped with a transfer device adapted to change the operating mode of the vehicle drive system to a two wheel drive mode and a four wheel drive mode, which drive mechanism comprises a differential case rotatably mounted within a differential housing, the differential case being provided thereon with a ring gear for rotation about a first axis and therein with a plurality of pinion gears for rotation about a second axis perpendicular to the first axis and a pair of side gears for rotation about the first axis and in meshing engagement with each of the pinion gears, a first axle shaft disposed along the first axis and connected to one of the side gears for rotation therewith, a second axle shaft disposed along the first axis and axially slidably connected to the other side gear for rotation therewith, a first output member disposed along the first axis to be connected to the first axle shaft and having an outer end adapted for attachment to one split axle part for driving one of a pair of vehicle road wheels, and a second output member disposed along the first axis to be connected to the second axle shaft and having an outer end adapted for attachment to the other split axle part for driving the other road wheel.

The split axle drive mechanism further comprises a clutch mechanism disengageable for disconnecting the first axle shaft from the first output member when the two wheel drive mode is selected at the transfer device and engageable for connecting the first axle shaft to the first output member when the four wheel drive mode is selected at the transfer device, a connecting rod axially slidably disposed in the first and second axle shafts and operatively connected at one end thereof with the clutch mechanism and at the other end thereof with one end of the second axle shaft to be maintained in a first position during disengagement of the clutch mechanism and to be moved to a second position in response to engagement of the clutch mechanism, and coupling means for connecting the second axle shaft to the second output member in response to movement of the connecting rod from the first position to the second position and for disconnecting the second axle shaft from the second output member in response to movement of the connecting rod from the second position to the first position.

BRIEF DESCRIPTION OF THE DRAWINGS

Additional objects, features and advantages of the present invention will become readily apparent from the following detailed description of preferred embodiments thereof when taken together with the accompanying drawings, in which.

DETAILED DESCRIPTION OF THE PREFERRED EMBODIMENTS

Figure 1:
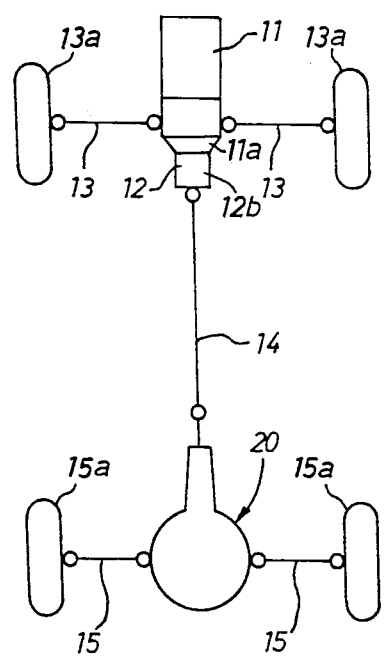
FIG. 1 is a schematic plan view of a part-time four-wheel drive vehicle incorporating a split axle drive mechanism in accordance with the present invention.
Figure 2:
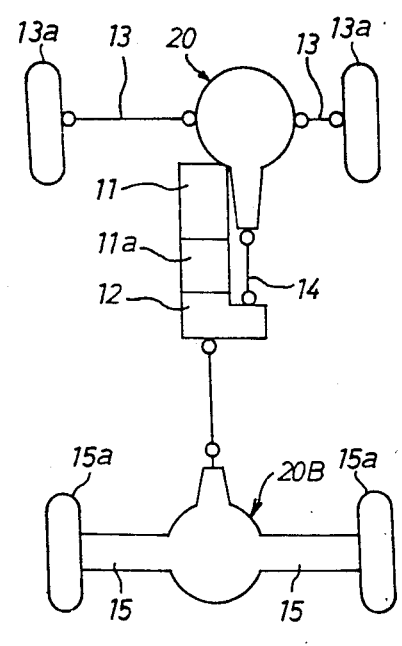
FIG. 2 is a schematic illustration of an application of the split axle drive mechanism to another type of part-time four-wheel drive vehicle.

Referring now to the drawings, in particular to FIG. 1, there is schematically illustrated a part-time four-wheel drive vehicle of the front-engine front-wheel drive type, which comprises an internal combustion engine 11 mounted on the front portion of a vehicle body structure, and a transfer device 12 attached to the rear end of engine 11 through a transmission 11a in a well-known manner. The transfer device 12 includes an input shaft drivingly connected to an output shaft of the transmission, a primary output shaft drivingly connected to the input shaft in the transfer device 12, and a secondary output shaft drivingly connectable to the input shaft by means of a remotely controlled clutch in the transfer device 12. The primary output shaft of transfer device 12 is drivingly connected to a pair of front split axle parts 13 to drive front steerable road wheels 13a, while the secondary output shaft of transfer device 12 is drivingly connected to a propeller shaft 14 which in turn is drivingly connected to a pair of rear split axle parts 15 by way of a split axle drive mechanism 20 in accordance with the present invention. As will be described in detail later, the split axle drive mechanism 20 is adapted to selectively drive rear road wheels 15a through the rear split axle parts 15 when a four-wheel drive mode is selected at the transfer device 12. As shown in FIG. 2, the split axle drive mechanism 20 may be adapted to a part-time four wheel drive vehicle of the front-engine rear-wheel drive type, wherein the primary output shaft of transfer device 12 is drivingly connected to a pair of rear split axle parts 15 through a conventional rear differential 20B, while the secondary output shaft of transfer device 12 is drivingly connected to a propeller shaft 14 which in turn is drivingly connected to a pair of front split axle parts 13 by way of the split axle drive mechanism 20.

Figure 3:
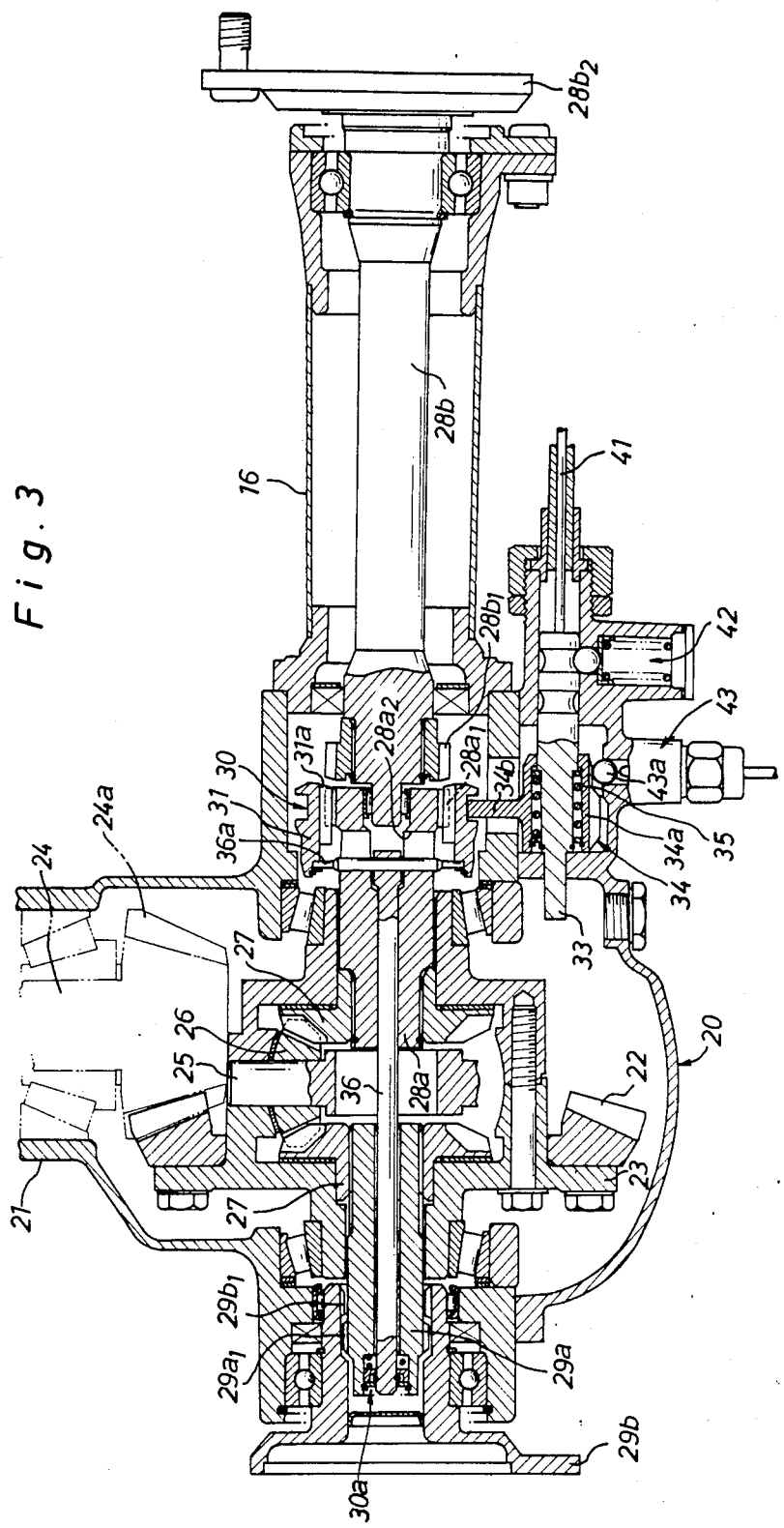
FIG. 3 is a sectioned plan view of the split axle drive mechanism shown in FIG. 1.

As shown in FIG. 3, the split axle drive mechanism 20 is in the form of a differential which comprises a differential housing 21 provided with a lateral extension tube 16 attached thereto, and a differential case 23 and a drive pinion shaft 24 rotatably mounted within the differential housing 21 on orthoganally related axes. The drive pinion shaft 24 is drivingly connected to the rear end of propeller shaft 14 and has a pinion 24a permanently meshed with a ring gear 22 attached to the differential case 23. The differential case 23 carries a plurality of rotatable pinion gears 26 each mounted on a cross pin 25. The pinion gears 26 are in meshing engagement with a pair of side gears 27 which are rotatably mounted in the differential case 23 and splined to each inner end of axle shafts 28a and 29a for rotation therewith. The axle shaft 28a is rotatably mounted in the differential case 23, while the stub shaft 29a is rotatably and axially slidably mounted in the differential case 23.

The right-hand axle shaft 28a is provided at its outer end with an integral spline wheel $28a_1$ and a radial through hole $28a_2$. Arranged coaxially with the axle shaft 28a is an extension shaft 28b which extends into the extension tube 16 through the differential housing 21 in a liquid-tight manner. The extension shaft 28b has its inner end journalled in the hollow outer end of axle shaft 28a and its outer end rotatably carried on a ball bearing at the outer end of extension tube 16. The extension shaft 28b has a matching spline wheel $28b_1$ attached to its inner end and is integrally provided at its outer end with an external flange $28b_2$ for attachment with the right-hand rear split axle part 15. The left-hand axle shaft 29a extends into the hollow inner end of an external flange 29b which is rotatably mounted in the differential housing 21 in a liquid-tight manner for attachment with the left-hand rear split axle part 15. The axle shaft 29a is formed at its outer end with an integral spline wheel $29a_1$, while the external flange 29b is formed at its inner end with an internally splined portion $29b_1$ to be brought into meshing engagement with the spline wheel $29a_1$ of axle shaft 29a.

To selectively establish drive connection between the rear split axle parts 15, the split axle drive mechanism 20 comprises a clutch mechanism 30 which includes an internally splined clutch sleeve 31 slidably mounted on the spline wheel $28a_1$ of axle shaft 28a. The splined clutch sleeve 31 is shiftable between a disengaged position shown in the figure and an engaged position where it couples the spline wheels $28a_1$ and $28b_1$. The clutch assembly 30 further includes a cross rod 36a extending across the radial hole $28a_2$ of axle shaft 28a and fixed at its opposite ends to the splined clutch sleeve 31, and a connecting rod 36 axially slidably disposed within the left-hand axle shaft 29a and connected at its inner end with the cross rod 36a and at its outer end with the axle shaft 29a by means of a connecting mechanism 30a. As can be well seen in FIG. 4, the connecting mechanism 30a includes a compression spring 37, a sleeve-like spring seat 38 and an annular plate 39 which are coaxially contained within the hollow outer end 29c of axle shaft 29a. The compression spring 37 is engaged at its one end with an end face of axle shaft 29a and at its other end with the spring seat 38. The spring seat 38 is axially slidable in the hollow outer end of axle shaft 29a and loaded by the biasing force of compression spring 37 toward the annular plate 39. A first annular retainer 32b is fixed to the axle shaft 29a to retain the annular plate 39 in place against the load of compression spring 37. A second annular retainer 36b is arranged between the annular plate 39 and an annular flange of spring seat 38 and fixed to the connecting rod 36.

When the splined clutch sleeve 31 is in the disengaged position as shown in the figure, the spring seat 38 is resiliently engaged with the annular plate 39 under the load of compression spring 37, and the second annular retainer 36b is positioned between the annular flange of spring seat 38 and the annular plate 39 to permit free relative rotation of the connecting rod 36 to the axle shaft 29a. When the splined clutch sleeve 31 is shifted to the engaged position to cause rightward movement of the connecting rod 36, the second annular retainer 36b is engaged with the annular flange of spring seat 38 to move it against the compression spring 37, and in turn the axle shaft 29a is shifted rightward under the load of compression spring 37 to engage the internally splined portion $29b_1$ of external flange 29b at its spline wheel $29a_1$. After engagement of the axle shaft 29a with the external flange 29b, the annular plate 39 is engaged with the spring seat 38 to slightly move it against the compression spring 37, and in turn the second annular retainer 36b is disengaged from the spring seat 38 to permit free relative rotation of the connecting rod 36 to the axle shaft 29a without causing any frictional engagement therebetween.

The split axle drive mechanism 20 further comprises a lever arm or control member 34 which is slidably mounted on a slide rod 33 at its base 34a and engaged with an external groove of the splined clutch sleeve 31 at its yoke 34b. The slide rod 33 is axially slidably mounted within one side portion of differential housing 21 and arranged in parallel with the axle shaft 28a and extension shaft 28b. The slide rod 33 is connected at its one end with an inner wire 41 of a remotely controlled push-pull cable to be translated and is selectively retained by a detent mechanism 42 to position the lever arm 34 in a shifted position. Assembled within the base portion 34a of lever arm 34 is a compression coil spring 35 which is compressed by engagement with the slide rod 33 in shifting operation to bias the lever arm 34 toward the shifted position of slide rod 33. The base portion 34a of lever arm 34 is further provided at its outer periphery with an axial projection engageable with a ball 43a of a switch assembly 43 which is arranged to detect the shfting operation of slide rod 33 so as to indicate the disengaged or engaged position of the clutch assembly 30.

In operation, the splined clutch sleeve 31 is retained in the disengaged position when a two wheel drive mode is selected at the transfer device 12 to disconnect the drive to the propeller shaft 14. In such a condition, the right-hand axle shaft 28a is disconnected from the extension shaft 28b, and the left-hand axle shaft 29a is disconnected from the external flange 29b. Thus, the non-driven rear road wheels 15a back drive only the extension shaft 28b and external flange 29b but do not back drive the axle shafts 28a, 29a, components in the differential case 23, drive pinion shaft 24, propeller shaft 14, and components connected to the secondary output shaft in the transfer device 12. This mode of operation reduces undesired noises in the non-driven system and eliminates wear and power consumption in the split axle drive mechanism 20 caused by back drive of the non-driven road wheels.

When a four wheel drive mode is selected at the transfer device 12 to drive the propeller shaft 14, the inner wire 41 of the remotely controlled push-pull cable is pulled to shift the slide rod 33 rightward, and in turn the detent mechanism 42 acts to permit rightward movement of the slide rod 33. In this instance, the compression spring 35 is compressed to urge the lever arm 34 rightward, and in turn the splined clutch sleeve 31 is shifted by the lever arm 34 toward its engaged position. Simultaneously, the connecting rod 36 is moved rightward by the splined clutch sleeve 31, and in turn the spline wheel $29a_1$ of axle shaft 29a is brought into meshing engagement with the internally splined portion 29b of external flange 29b. If in such shifting operation the splined clutch sleeve 31 is synchronized in rotation to the extension shaft 28b, it will be smoothly engaged with the spline wheel $28b_1$ of extension shaft 28b to connect the axle shaft 28a to the extension shaft 28b. If the clutch sleeve 31 is not synchronized in rotation to the extension shaft 28b, it will be resiliently engaged with one end of the spline wheel $28b_1$ under the load of compression spring 35 and subsequently engaged with the spline wheel $28b_1$ to connect the axle shaft 28a to the extension shaft 28b.

During rightward movement of the clutch sleeve 31, the second annular retainer 36b fixed to connecting rod 36 is engaged with the annular flange of spring seat 38 to move it against the compression spring 37, and in turn the axle shaft 29a is shifted rightward under the load of compression spring 37 to engage the internally splined portion $29b_1$ of external flange 29b at its spline wheel $29a_1$. If in such a situation the axle shaft 29a is synchronized in rotation to the external flange 29b, the spline wheel $29a_1$ of axle shaft 29a will be smoothly engaged with the internally splined portion $29b_1$ of external flange 29b. If the axle shaft 29a is not synchronized in rotation to the external flange 29b, the spline wheel $29a_1$ of axle shaft 29a will be resiliently engaged with one end of the internally splined portion $29b_1$ of external flange 29b under the load of compression spring 37 and subsequently engaged with the internally splined portion $29b_1$ of external flange 29b. After engagement of the axle shaft 29a with the external flange 29b, the annular plate 39 will engage the spring seat 38 to slightly move it against the compression spring 37, and in turn the second annular retainer 36b will be disengaged from the spring seat 38 to permit free relative rotation between the connecting rod 36 and the axle shaft 29a. Thus, the split axle drive mechanism 20 operates as a conventional differential to transmit the power from drive pinion shaft 24 to the rear split axle parts 15 for the four wheel drive.

Figure 4:
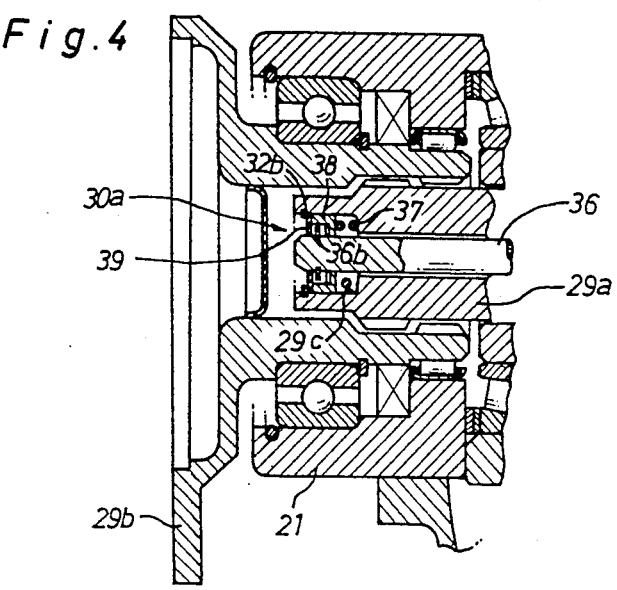
FIG. 4 is an enlarged illustration of a portion of FIG. 3.
Figure 5:
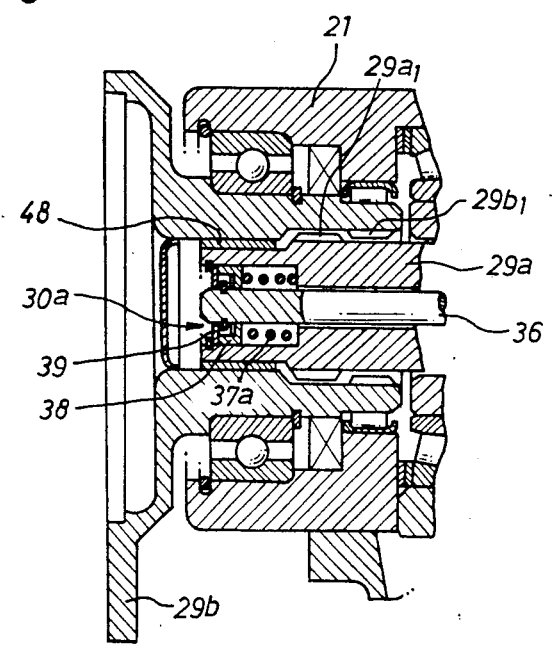
FIG. 5 illustrates a modification of the connecting mechanism shown in FIG. 4.

In FIG. 5 there is illustrated a modification of the split axle drive mechanism 20, wherein the outer end of axle shaft 29a is slightly extended outwardly to contain therein a compression coil spring 37a the free length of which is larger than that of the compression spring 37 shown in FIG. 4, and wherein the outer end of axle shaft 29a is rotatably and axially slidably supported by a cylindrical bush 48 fixedly coupled within the external flange 29b. The other components are substantially the same as those in the connecting mechanism 30a shown in FIG. 4. In this modification, the axle shaft 29a can be precisely centered by support at its opposite ends coupled with the side gear 27 and the cylindrical bush 48. Thus, smooth axial movement of the axle shaft 29a is effected without causing any irregular contact with the internal periphery of external flange 29b in shifting operation of the clutch sleeve 31, and smooth engagement of the spline wheel $29a_1$ with the internally splined portion $29b_1$ of external flange 29b is effected to eliminate the occurrence of a thrusting force acting thereon.

Figure 6:
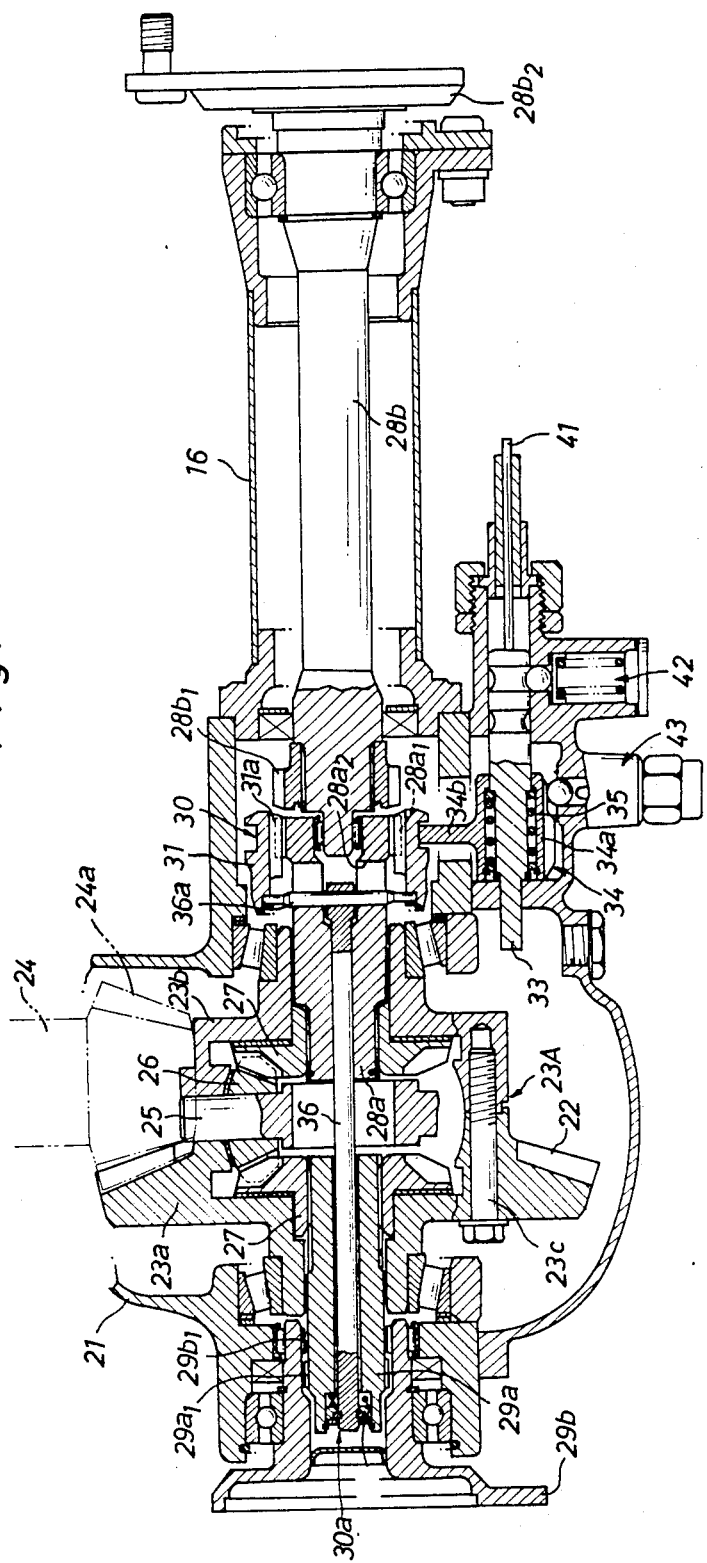
FIGS. 6 to 9 illustrate modifications of the split axle drive mechanism shown in FIG. 3.
Figure 7:
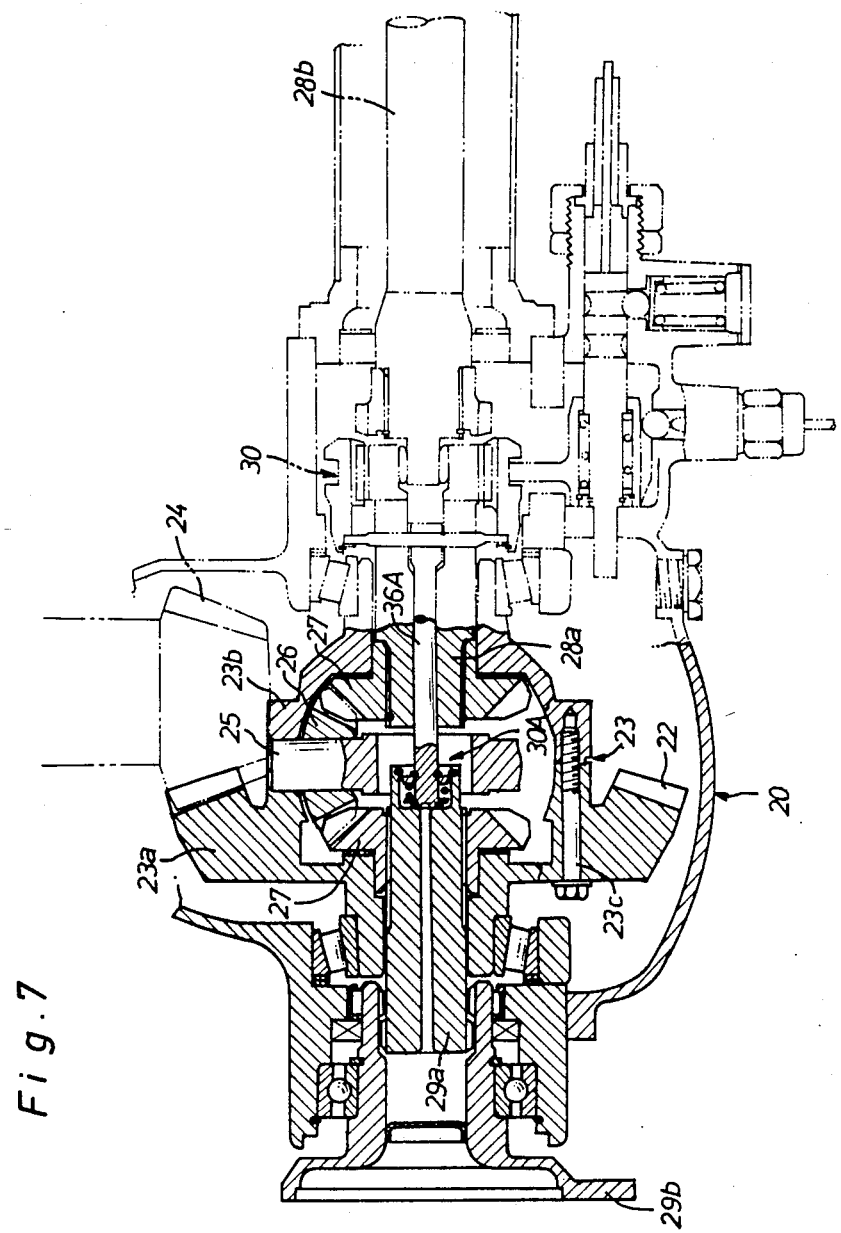

In FIG. 6 there is illustrated another modification of the split axle drive mechanism 20, wherein the differential case 23 is replaced with a differential case 23A which is composed of a pair of split cases 23a and 23b. The left-hand split case 23a is integrally formed at its outer periphery with a ring gear 22a in meshing engagement with the pinion 24a of drive pinion shaft 24, and the right-hand split case 23b is secured to the left-hand split case 23a by means of a plurality of fastening bolts 23c. The other components and construction are substantially the same as those in the split axle drive mechanism 20 shown in FIG. 3. In this modification, the ring gear 22a can be constructed smaller in diameter than the ring gear 20 of FIG. 3 so that the differential housing 21 is constructed in the substantially same size as that of the housing for a convential differential. In FIG. 7 there is illustrated a further modification of the split axle drive mechanism 20, wherein the connecting rod 36 is replaced with a short connecting rod 36A which is connected to the inner end of axle shaft 29a by means of a connecting mechanism 30A. The construction and operation of the connecting mechanism 30A are substantially the same as those of the connecting mechanism 30a shown in FIG. 4, and the other construction of this modification is also substantially the same as that of the modification shown in FIG. 6.

Figure 8:
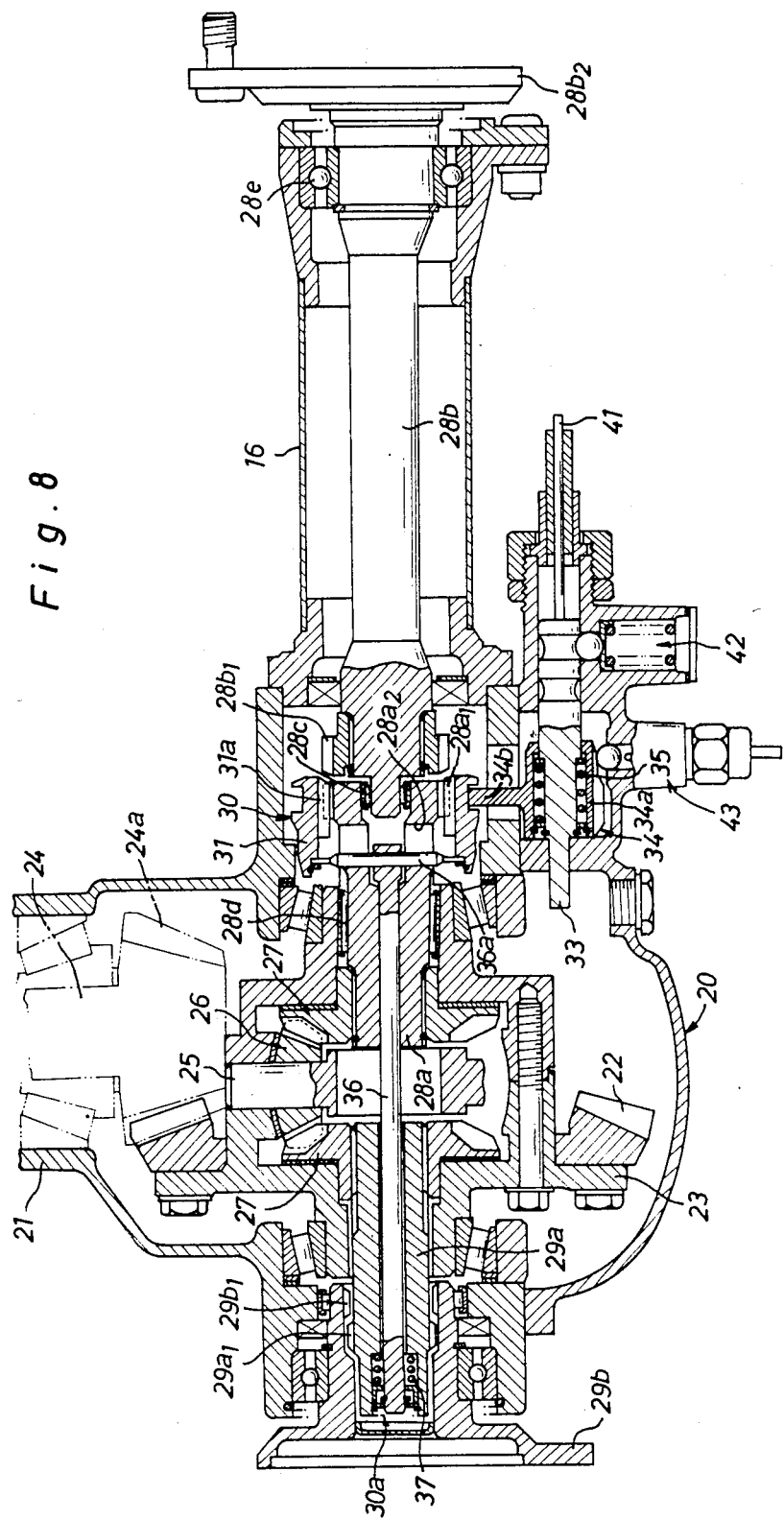
Figure 9:
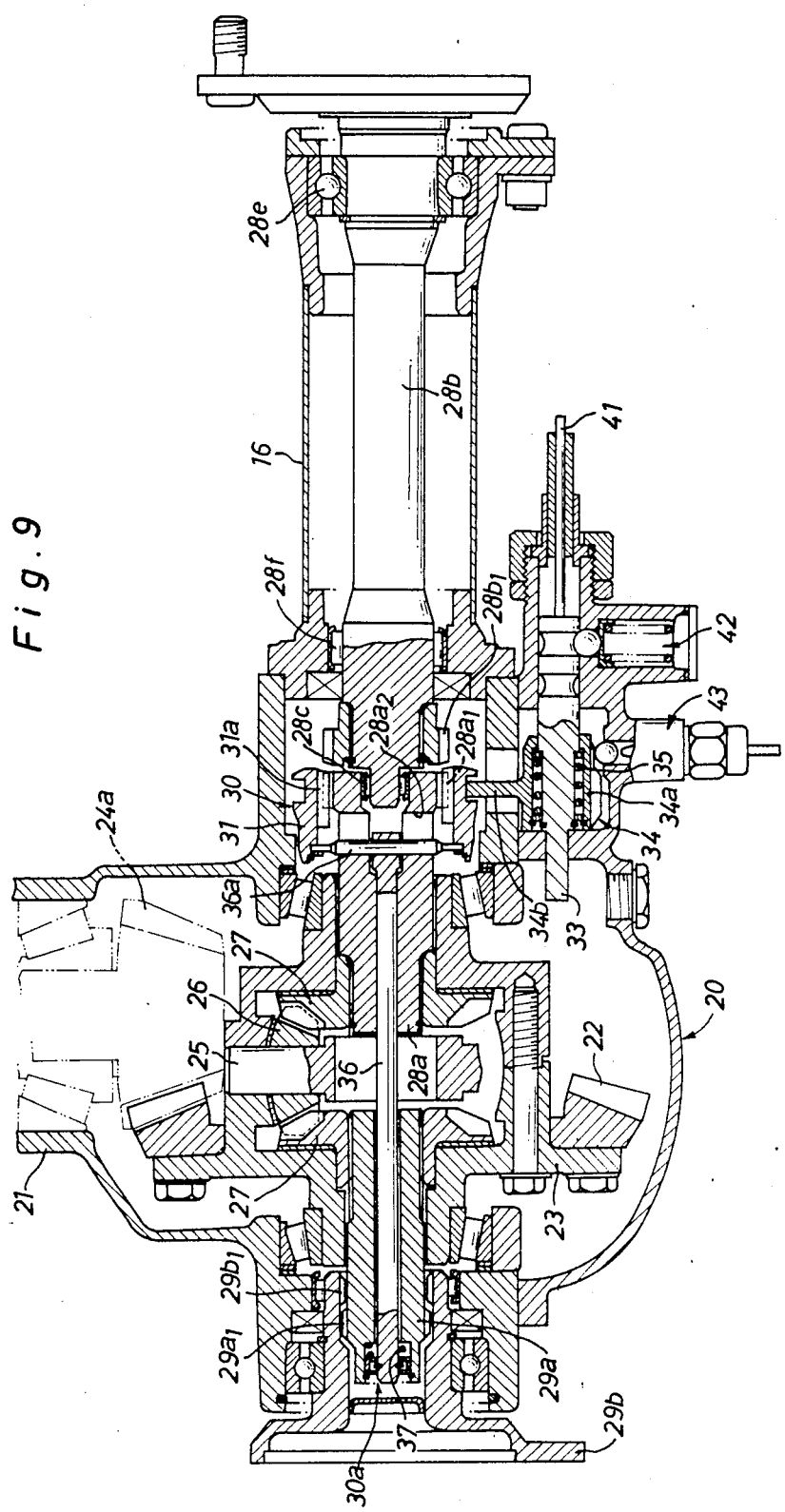

In the actual practice of the present invention, it is desirable that the split axle drive mechanism 20 is modified as shown in FIG. 8, wherein the right-hand axle shaft 28a is rotatably supported by a needle bearing 28d coupled within the differential case 23. In such a modification, the right-hand axle shaft 28a itself can be precisely centered by support of the side gear 27 and the needle bearing 28d so that the extension shaft 28b is precisely centered by support of axially spaced bearings 28c and 28e. Alternatively, the split axle drive mechanism 20 may be modified as shown in FIG. 9, wherein the extension shaft 28b is rotatably supported at its intermediate portion by means of a needle bearing 28f coupled within the inner end of extension tube assembly 16. In this arrangement, the extension shaft 28b itself can be precisely centered by support of axially spaced bearings 28f and 28e in the extension tube 16 so that the right-hand axle shaft 28a is precisely centered by support of the side gear 27 and the inner end of extension shaft 28b.

Figure 10:
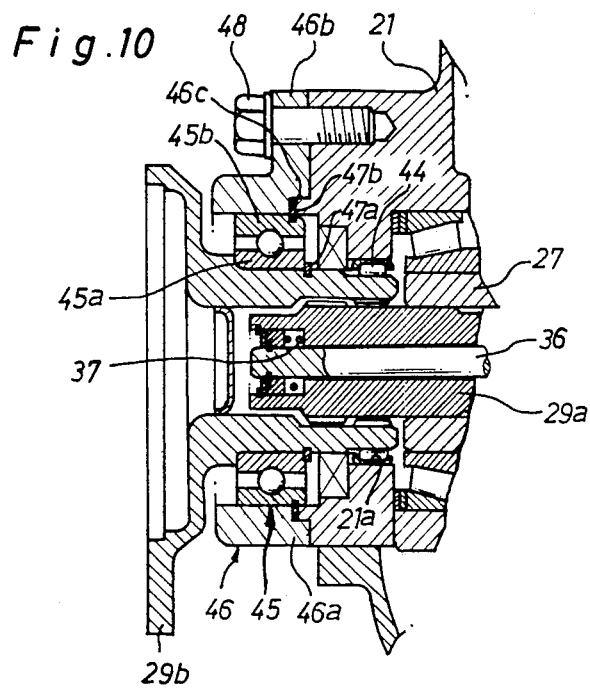
FIG. 10 is a partially sectioned plan view illustrating a modified mounting construction of an external flange respectively shown in FIGS. 3 to 9.
Figure 11:
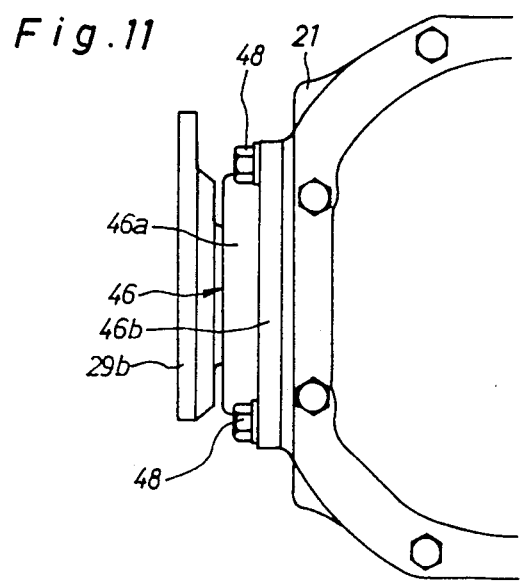
FIG. 11 is a rear view of the mounting construction shown in FIG. 10.

In FIGS. 10 and 11 there is illustrated a modification of the mounting construction for the left-hand external flange 29b in the split axle drive mechanism 20, wherein the external flange 29b is rotatably supported at its inner end by means of a needle bearing 44 carried on an internal wall 21a of differential housing 21 and is further rotatably supported at its intermediate portion by means of a ball bearing 45 coupled within a retainer member 46. With such an arrangement of the bearings 44 and 45, the external flange 29b is arranged coaxially with the left-hand axle shaft 29a in the split axle drive mechanism 20. The ball bearing 45 has an inner race 45a coupled with the outer periphery of external flange 29b and positioned in place by engagement with an annular retainer 47a fixed to the external flange 29b. An outer race 45b of ball bearing 45 is formed with an annular recess in which an annular retainer 47b is engaged. The retainer member 46 has a cylindrical support portion 46a formed at its inner end face with an annular recess 46c, and a rectangular flange 46b extending radially outwardly from the cylindrical support portion 46a. The retainer member 46 is secured at its rectangular flange 46b to an outer end face of the differential housing 21 by means of a plurality of fastening bolts 48 in such a manner that the annular retainer 47b is coupled within the annular recess 46c and engaged with the end face of housing 21 to position the ball bearing 45 in place.

In the above-described modification of FIGS. 10 and 11, the external flange 29b can be disassembled together with the ball bearing 45 in a simple manner by removal of the retainer member 46. This facilitates inspection and service of the external flange assembly. When the retainer member 46 is attached to the differential housing 21 and secured in place by fastening bolts 48 to assemble the external flange 29b, the ball bearing 45 is precisely positioned in place.

Figure 12:
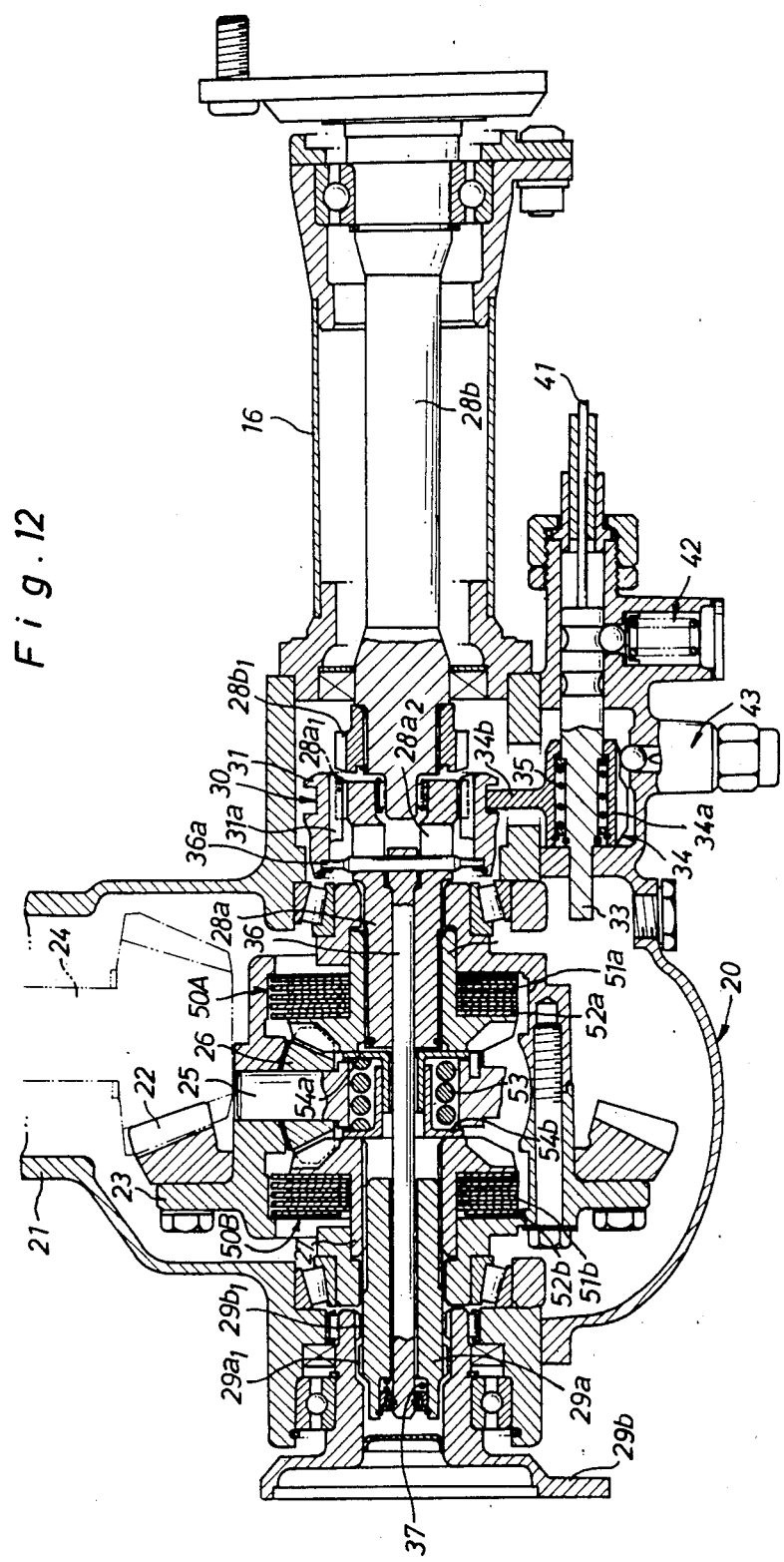
FIGS. 12 and 13 illustrate other modifications of the split axle drive mechanism shown in FIG. 3.

In FIG. 12 there is illustrated a modification of the split axle drive mechanism 20, wherein a pair of differential restriction means 50A and 50B are assembled within the differential case 23 to restrict differential operation between differential case 23 and side gears 27 only when the vehicle is in the four wheel drive mode.

The differential restriction means 50A and 50B each comprises a plurality of annular friction plates 51a, 51b, and a plurality of friction discs 52a, 52b. The annular friction plates 51a, 51b each are arranged in surrounding relationship with each sleeve portion of the side gears 27, 27 and axially slidably mounted on the inner periphery of differential case 23 for rotation therewith. The friction discs 52a, 52b each are arranged between the annular friction plates 51a, 51b and axially slidably mounted on each sleeve portion of the side gears 27, 27 for rotation therewith. Disposed between the side gears 27 and 27 is a compression coil spring 53 which is arranged in surrounding relationship with the connecting rod 36 and engaged at its opposite ends with the respective inner ends of side gears 27 through a pair of flanged sleeve-like retainers 54a, 54b to effect relative engagement between the friction plates 51a, 51b and the friction discs 52a, 52b. In operation of the split axle drive mechanism 20 in the four wheel drive mode of the vehicle, relative rotation of the side gears 27 to the differential case 23 will occur a frictional torque between the friction plates 51a, 51b and the friction discs 52a, 52b. This results in increase of the driving torque of one of the side gears 27 rotating at a low speed and decrease of the driving torque of the other side gear 27 rotating at a high speed.

Figure 13:
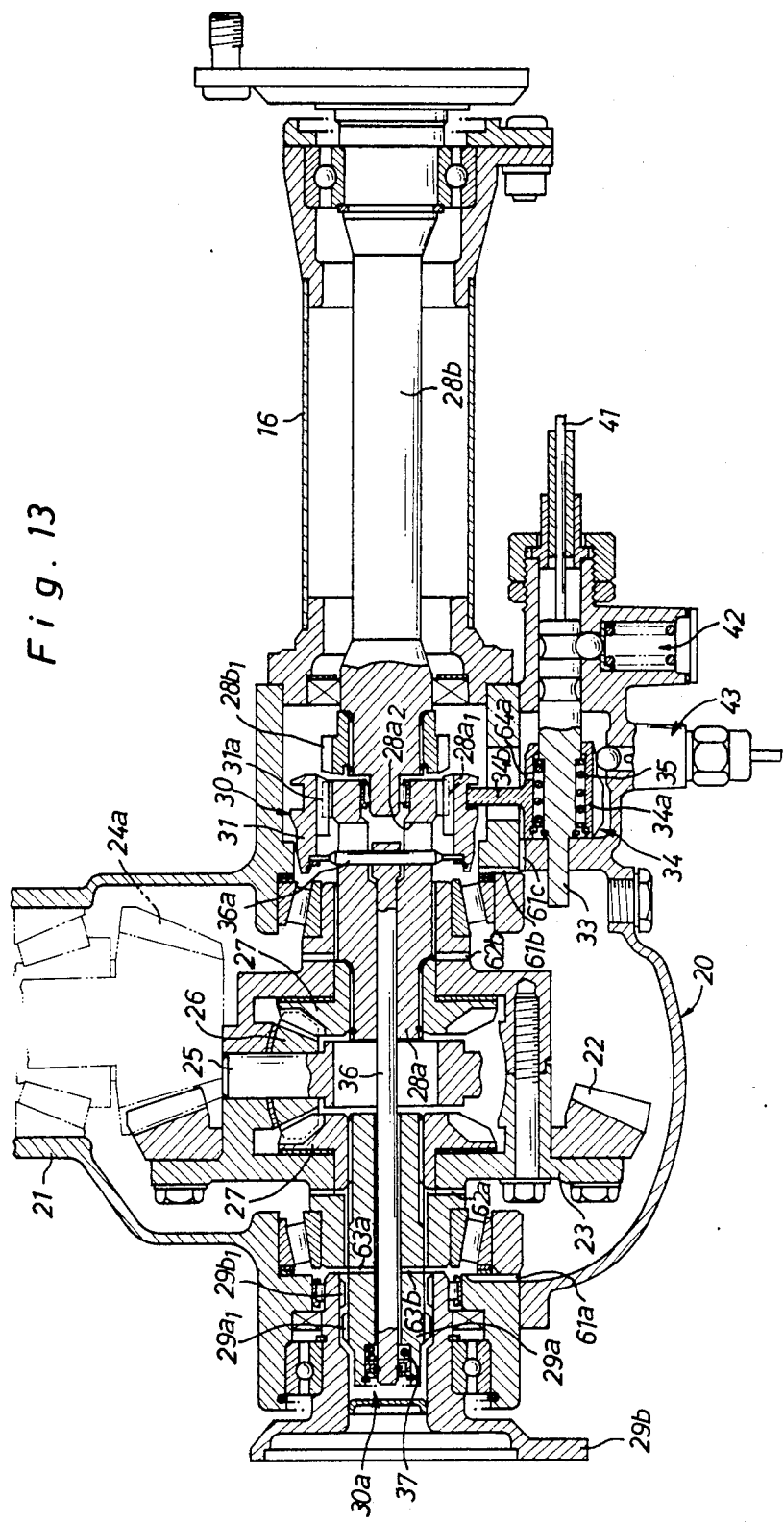

In FIG. 13, there is illustrated a preferred lubrication mechanism in the split axle drive mechanism 20, wherein the differential housing 21 is formed with radial oil passages 61a, 61b adjacent tapered roller bearings for the differential case 23 and an axial oil passage 61c for allowing the lubricating oil from the interior of housing 21 toward the lever arm 34, and wherein the differential case 23 is formed with a pair of radial oil passages 62a and 62b adjacent the side gears 27. Furthermore, the left-hand axle shaft 29a is formed with radial oil passages 63a and 63b for communication with the radial oil passage 61a of housing 21, and the hollow base portion 34a of lever arm 34 is formed with a radial hole 64a for lubrication of the compression coil spring 35. In operation of the split axle drive mechanism 20, the lubricating oil picked up by the ring gear 22 is supplied into the connecting mechanism 30a through passages 61a, 63a, 63b. The lubricating oil is also supplied into the sliding portions of axle shaft 29a through passages 61a, 62a and supplied into the sliding portions of axle shaft 28a through passages 61b, 62b. The lubricating oil is further supplied into the interior of base portion 34a of lever shaft 34 through passages 61c, 64a.

Having now fully set forth both structure and operation of preferred embodiments of the concept underlying the present invention, various other embodiments as well as certain modifications and variations of the embodiments shown and decribed herein will obviously occur to those skilled in the art upon becoming familiar with said underlying concept. It is to be understood, therefore, that within the scope of the appended claims, the invention may be practiced otherwise than as specifically set forth herein.

The embodiments of the invention in which an exculsive property or privilege is claimed are defined as follows:

1. A split axle drive mechanism for a part-time four-wheel drive vehicle equipped with a transfer device adapted to change the operating mode of the vehicle drive system to a two wheel drive mode and a four wheel drive mode, comprising:

a differential housing;

a differential case rotatably mounted within said housing, said differential case being provided thereon with a ring gear for rotation about a first axis and provided therein with a plurality of pinion gears for rotation about a second axis perpendicular to said first axis and a pair of side gears for rotation about said first axis and in meshing engagement with each of said pinion gears;

a first axle shaft disposed along said first axis and connected to one of said side gears for rotation therewith;

a second axle shaft disposed along said first axis and axially slidably connected to the other side gear for rotation therewith;

a first output member disposed along said first axis to be connected to said first axle shaft and having an outer end adapted for attachment to one split axle part for driving one of a pair of vehicle road wheels;

a second output member disposed along said first axis to be connected to said second axle shaft and having an outer end adapted for attachment to the other split axle part for driving the other road wheel;

a clutch mechanism disengageable for disconnecting said first axle shaft from said first output member when the two wheel drive mode is selected at said transfer device and engageable for connecting said first axle shaft to said first output member when the four wheel drive mode is selected at said transfer device;

a connecting rod axially slidably disposed in said first and second axle shafts and operatively connected at one end thereof with said clutch mechanism and at the other end thereof with one end of said second axle shaft to be maintained in a first position during disengagement of said clutch mechanism and to be moved to a second position in response to engagement of said clutch mechanism; and coupling means for connecting said second axle shaft to said second output member in response to movement of said connecting rod from said first position to said second position and for disconnecting said second axle shaft from said second output member in response to movement of said connecting rod from said second position to said first position.

2. A split axle drive mechanism as recited in claim 1, wherein said clutch mechanism includes a spline wheel provided on the outer end of said first axle shaft, a matching spline wheel provided on the inner end of said first output member, an internally splined clutch sleeve axially slidably mounted on said spline wheel on said first axle shaft and shiftable between a disengaged position where it disengages from said matching spline wheel and an engaged position where it couples said spline wheels to connect said first axle shaft to said first output member, and wherein a shifting mechanism is provided to axially translate said clutch sleeve between said disengaged and engaged positions, said shifting mechanism including a remotely controlled slide rod axially slidably mounted within a portion of said differential housing and arranged in parallel with said first axle shaft and said first output member, and a lever arm connected at one end thereof with said slide rod and engaged at the other end thereof with said clutch sleeve.

3. A split axle drive mechanism as recited in claim 1, wherein said second output member is in the form of an external flange rotatably mounted within said differential housing and having a cylindrical portion arranged in surrounding relationship with the outer end of said second axle shaft, and wherein said coupling means includes a spline wheel provided on the outer end of said second axle shaft, and an internally spline portion formed in the cylindrical portion of said external flange to be brought into meshing engagement with said spline wheel on said second axle shaft.

4. A split axle drive mechanism as recited in claim 1, wherein means for operatively connecting the other end of said connecting rod to said second axle shaft includes a compression coil spring, a sleeve-like spring seat and an annular plate contained coaxially within a hollow outer end of said second axle shaft and arranged in surrounding relationship with said connecting rod, said compression coil spring having one end engaged with an end face of said second axle shaft, said spring seat being engaged with the other end of said spring, and said annular plate being engaged with said spring seat and retained in place by engagement with a first annular retainer fixed to the outer end of said second axle shaft, and wherein a second annular retainer is fixed to the outer end of said connecting rod and arranged between said spring seat and said annular plate to be engaged with said spring seat in response to movement of said connecting rod toward said second position.

5. A split axle drive mechanism as recited in claim 1, wherein said second output member is in the form of an external flange rotatably mounted within said differential housing and having a cylindrical portion arranged in surrounding relationship with the outer end of said second axle shaft, and wherein a cylindrical bush is fixedly coupled within the cylindrical portion of said external flange to rotatably support the outer end of said second axle shaft.

6. A split axle drive mechanism as recited in claim 1, wherein said ring gear is integrally formed on the outer periphery of said differential case.

7. A split axle drive mechanism as recited in claim 1, wherein said first axle shaft has an inner end splined to said side gear and an intermediate portion rotatably supported by a bearing coupled within said differential case.

8. A split axle drive mechanism as recited in claim 1, wherein said differential housing is provided with a lateral extension tube secured thereto, and wherein said first output member is in the form of an extension shaft arranged coaxially with said first axle shaft and extending outwardly through said extension tube, said extension shaft being rotatably supported by a pair of axially spaced bearings carried within said extension tube.

9. A split axle drive mechanism as recited in claim 1, wherein said second output member is in the form of an external flange rotatably mounted within said differential housing and having a cylindrical portion arranged in surrounding relationship with the outer end of said second axle shaft, and wherein said external flange is rotatably supported by a ball bearing coupled within a retainer member which is detachably secured to an outer end face of said differential housing in such manner that said ball bearing is positioned in place by engagement with the outer end face of said housing and that the cylindrical portion of said external flange is rotatably supported on an internal wall of said housing.

10. A split axle drive mechanism as recited in claim 1, wherein a pair of differential restriction means are disposed between said side gears and the inner periphery of said differential case to restrict differential operation of said side gears when the vehicle is in the four wheel drive mode.

11. A split axle drive mechanism as recited in claim 1, wherein said differential case is formed with a pair of radial oil passages through which the lubricating oil picked up by said ring gear is supplied into each sliding portion of said axle shafts.

12. A split axle drive mechanism for a part-time four-wheel drive vehicle equipped with a transfer device adapted to change the operating mode of the vehicle drive system to a two wheel drive mode and a four wheel drive mode, comprising:

a differential housing;

a differential case rotatably mounted within said housing, said differential case being provided thereon with a ring gear for rotation about a first axis and therein with a plurality of pinion gears for rotation about a second axis perpendicular to said first axis and a pair of side gears for rotation about said first axis and in meshing engagement with each of said pinion gears;

a first axle shaft disposed along said first axis and connected to one of said side gears for rotation therewith;

a second axle shaft disposed along said first axis and axially slidably connected to the other side gear for rotation therewith;

a first output member disposed along said first axis to be connected to said first axle shaft and having an outer end adapted for attachment to one split axle part for driving one of a pair of vehicle road wheels;

a second output member disposed along said first axis to be connected to said second axle shaft and having an outer end adapted for attachment to the other split axle part for driving the other road wheel;

a clutch mechanism disengageable for disconnecting said first axle shaft from said first output member when the two wheel drive mode is selected at said transfer device and engageable for connecting said first axle shaft to said first output member when the four wheel drive mode is selected at said transfer device;

a connecting rod axially slidably disposed in said first axle shaft and operatively connected at one end thereof with said clutch mechanism and at the other end thereof with the inner end of said second axle shaft to be maintained in a first position during disengagement of said clutch mechanism and to be moved to a second position in response to engagement of said clutch mechanism; and coupling means for connecting said second axle shaft to said second output member in response to movement of said connecting rod from said first position to said second position and for disconnecting said second axle shaft from said second output member in response to movement of said connecting rod from said second position to said first position.

* * * * *